US011013033B2

(12) United States Patent
Fischer et al.

(10) Patent No.: US 11,013,033 B2
(45) Date of Patent: May 18, 2021

(54) SPATIAL REUSE CLEAR TO SEND (CTS) WITHIN WIRELESS COMMUNICATIONS

(71) Applicant: Avago Technologies International Sales Pte. Limited, Singapore (SG)

(72) Inventors: Matthew James Fischer, Mountain View, CA (US); Ron Porat, San Diego, CA (US)

(73) Assignee: Avago Technologies International Sales Pte. Limited, Singapore (SG)

(*) Notice: Subject to any disclaimer, the term of this patent is extended or adjusted under 35 U.S.C. 154(b) by 178 days.

(21) Appl. No.: 15/054,886

(22) Filed: Feb. 26, 2016

(65) Prior Publication Data

US 2016/0183304 A1 Jun. 23, 2016

Related U.S. Application Data

(63) Continuation-in-part of application No. 14/192,228, filed on Feb. 27, 2014, now Pat. No. 9,379,837.
(Continued)

(51) Int. Cl.
| | | |
|---|---|---|
| *H04W 74/08* | (2009.01) | |
| *H04W 52/16* | (2009.01) | |
| *H04B 17/336* | (2015.01) | |
| *H04B 17/345* | (2015.01) | |
| *H04B 7/06* | (2006.01) | |

(Continued)

(52) U.S. Cl.
CPC ...... *H04W 74/0816* (2013.01); *H04B 7/0634* (2013.01); *H04B 17/318* (2015.01); *H04B 17/336* (2015.01); *H04B 17/345* (2015.01); *H04J 11/0026* (2013.01);
(Continued)

(58) Field of Classification Search
CPC ......... H04W 74/0808; H04W 52/0216; H04W 52/0238; H04W 52/24; H04W 52/367; H04W 52/383; H04W 72/0446; H04W 74/002; H04W 74/0816; H04W 28/26;
(Continued)

(56) References Cited

U.S. PATENT DOCUMENTS

| | | | | |
|---|---|---|---|---|
| 2010/0329131 | A1* | 12/2010 | Oyman | H04W 74/085 370/252 |
| 2012/0099450 | A1* | 4/2012 | Madan | H04W 74/0816 370/252 |
| 2015/0250003 | A1* | 9/2015 | Seok | H04W 74/0816 370/329 |

* cited by examiner

*Primary Examiner* — Yemane Mesfin
*Assistant Examiner* — Mon Cheri S Davenport
(74) *Attorney, Agent, or Firm* — Foley & Lardner LLP

(57) ABSTRACT

A wireless communication device (alternatively, device) includes a processing circuitry configured to support communications with other wireless communication device(s) and to generate and process signals for such communications. In some examples, the device includes a communication interface and a processing circuitry, among other possible circuitries, components, elements, etc. to support communications with other wireless communication device(s) and to generate and process signals for such communications. A device receives a request to send (RTS) from another device and replies with a clear to send (CTS) when the RTS includes a non-zero-valued network allocation vector (NAV) if one or more conditions make such a response permissible. The device processes other parameter(s) associated with other communications between other devices to determine if a CTS response is permissible even during the other communications between the other devices. If comparison of the other parameter(s) is/are favorably to certain condition(s), the device transmits the CTS.

20 Claims, 7 Drawing Sheets

Related U.S. Application Data

(60) Provisional application No. 62/126,369, filed on Feb. 27, 2015, provisional application No. 61/804,718, filed on Mar. 24, 2013, provisional application No. 61/888,873, filed on Oct. 9, 2013, provisional application No. 61/936,158, filed on Feb. 5, 2014.

(51) Int. Cl.
| | | |
|---|---|---|
| *H04W 16/14* | (2009.01) | |
| *H04J 11/00* | (2006.01) | |
| *H04B 17/318* | (2015.01) | |
| *H04W 52/50* | (2009.01) | |
| *H04W 52/24* | (2009.01) | |

(52) U.S. Cl.
CPC ........... *H04W 16/14* (2013.01); *H04W 52/16* (2013.01); *H04W 52/245* (2013.01); *H04W 52/50* (2013.01)

(58) Field of Classification Search
CPC . H04W 52/02; H04W 72/042; H04W 72/085; Y02B 60/50; H04L 5/0055
See application file for complete search history.

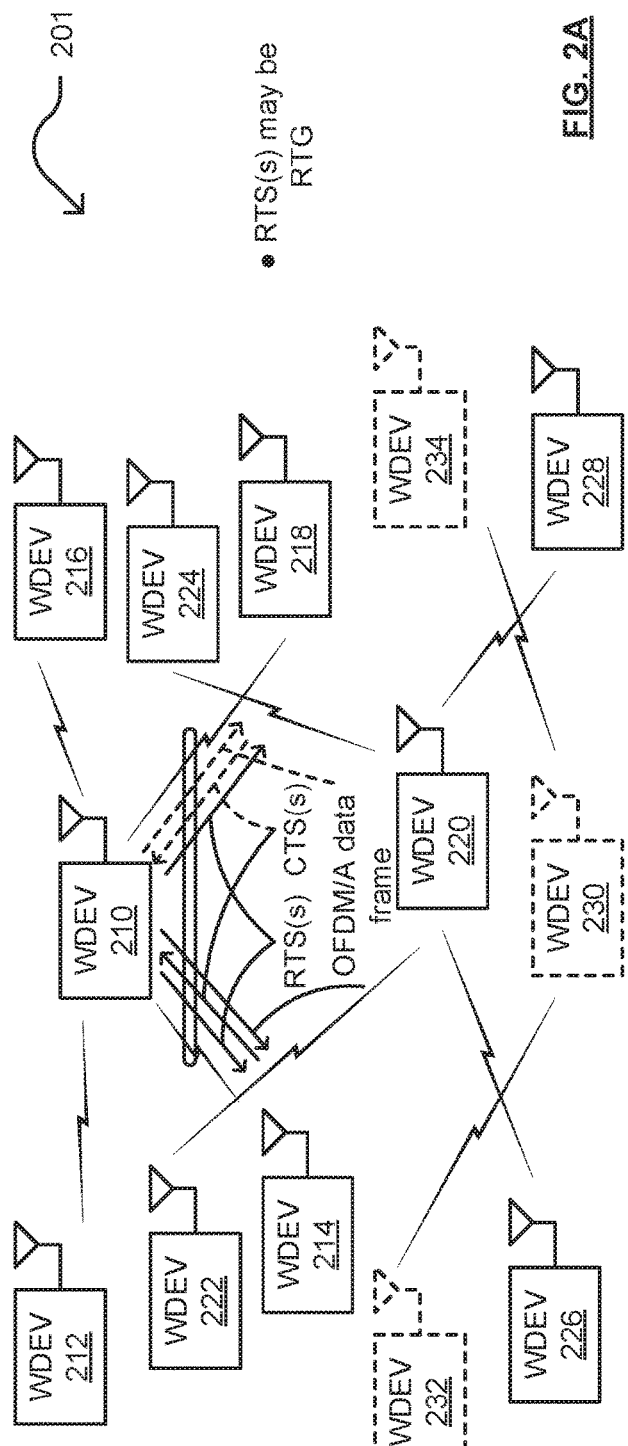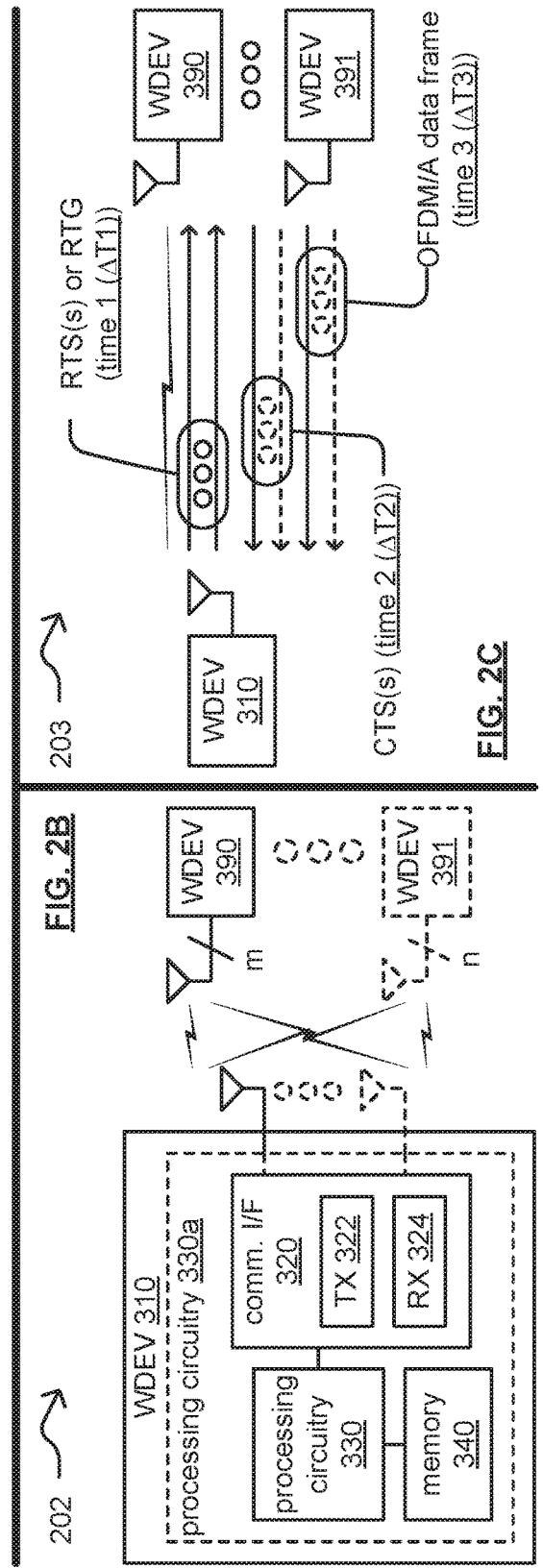

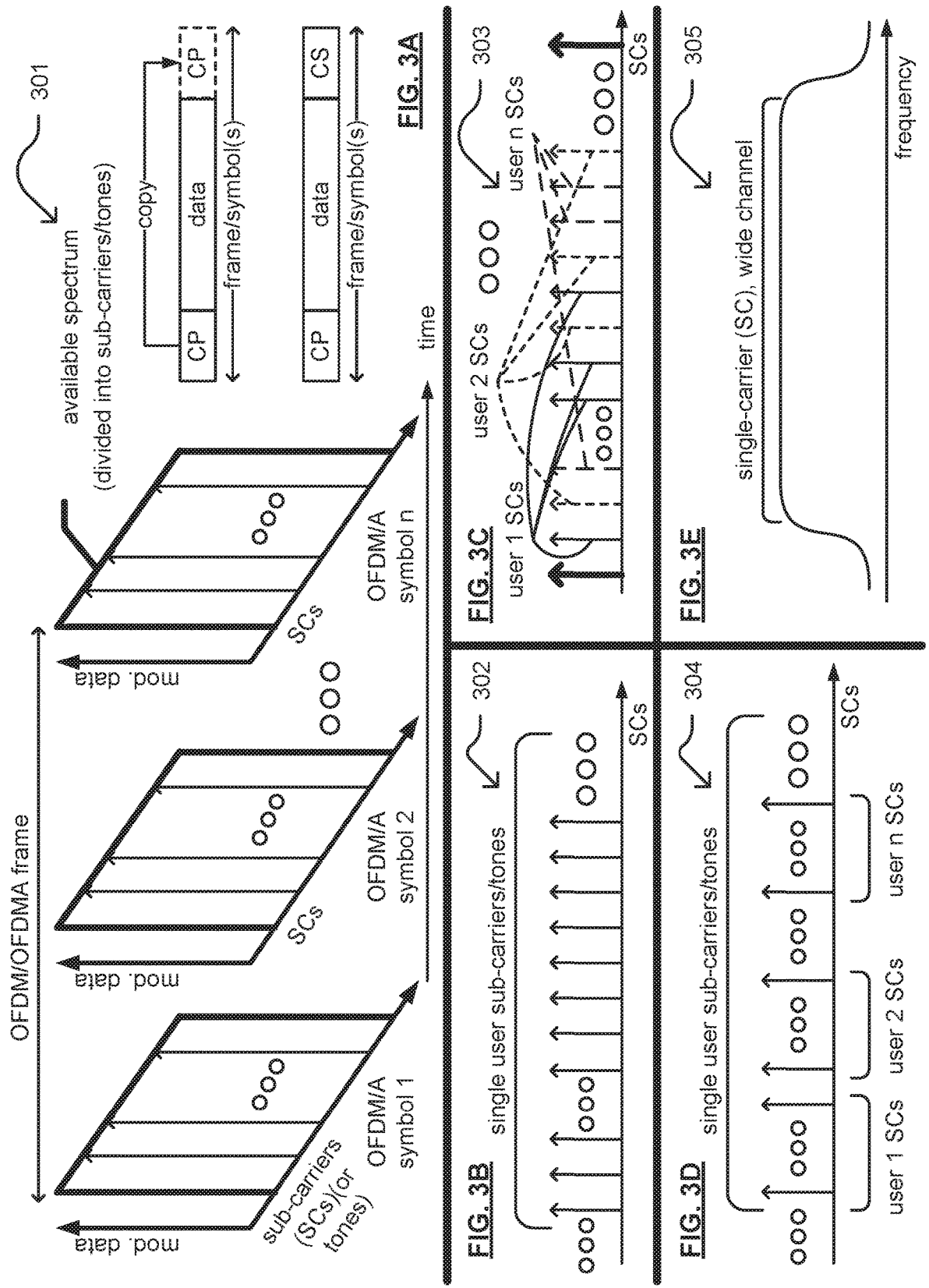

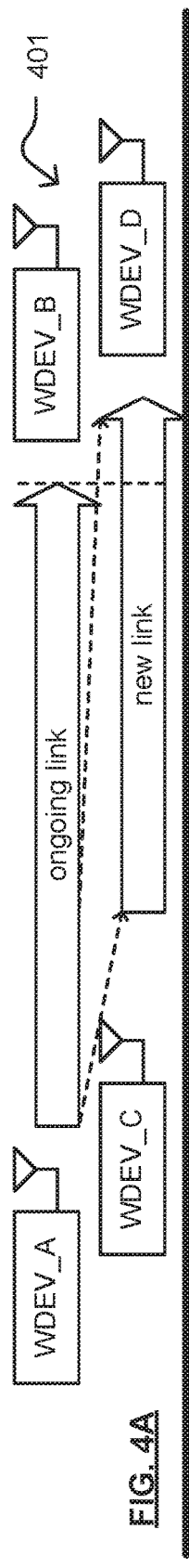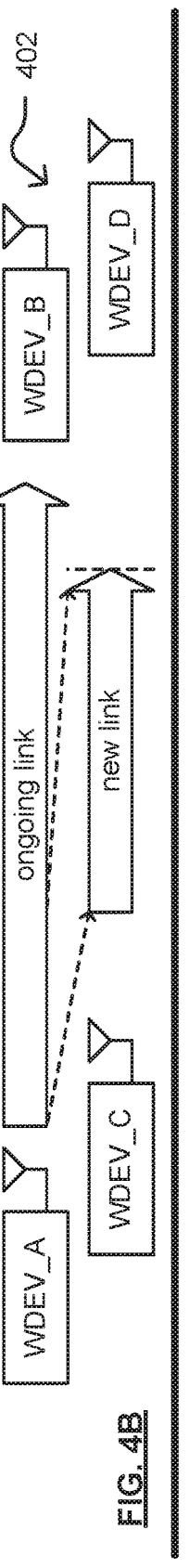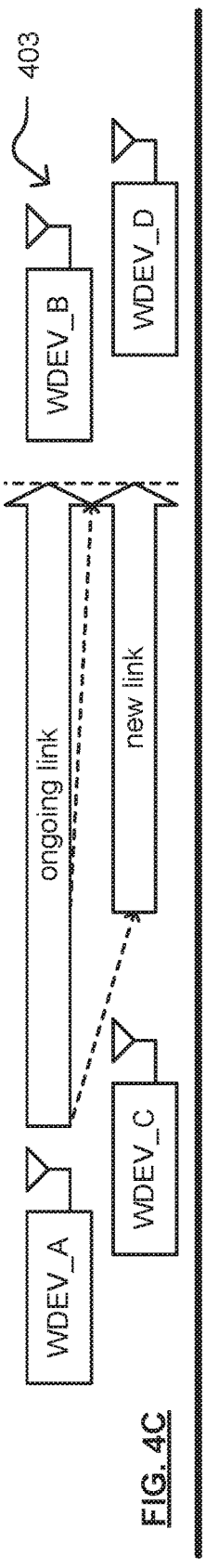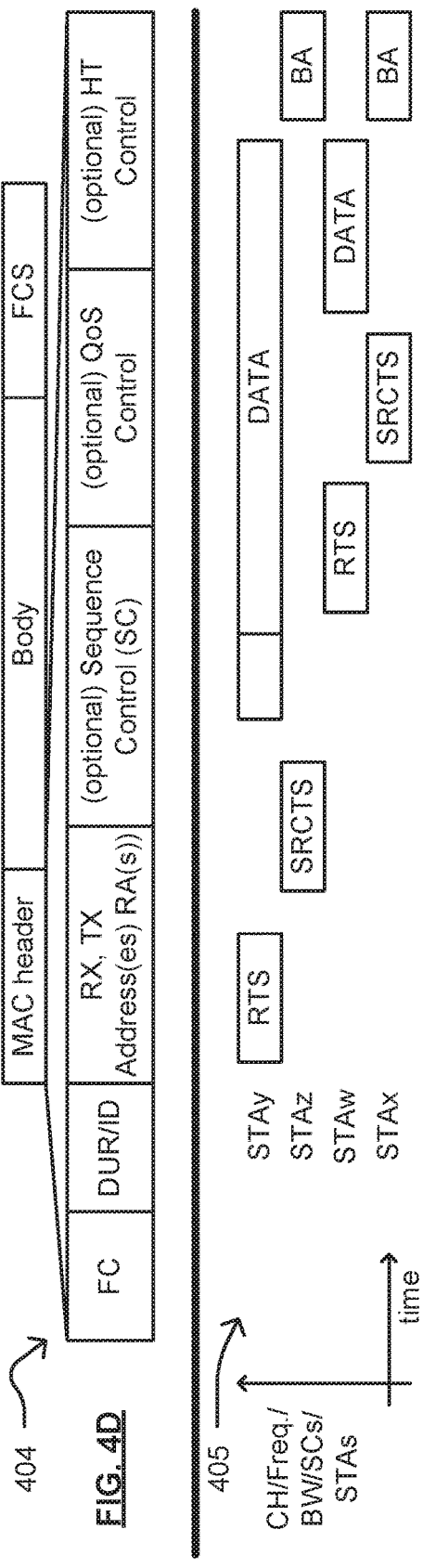

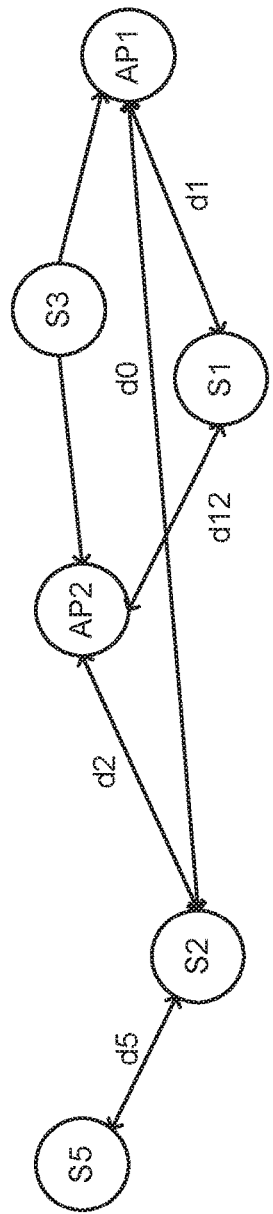

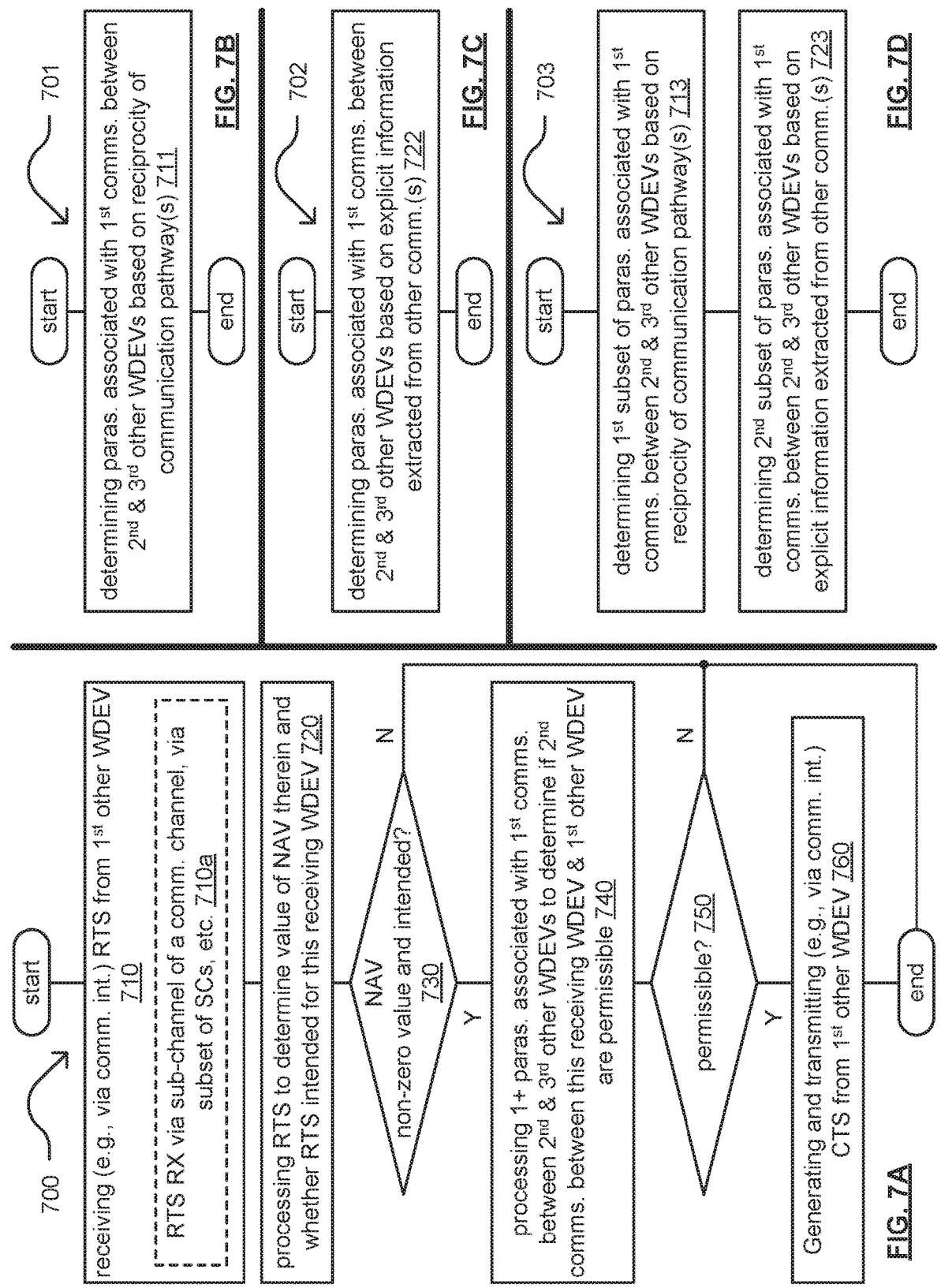

SPATIAL REUSE CLEAR TO SEND (CTS) WITHIN WIRELESS COMMUNICATIONS

CROSS REFERENCE TO RELATED PATENTS/PATENT APPLICATIONS

Provisional Priority Claim

The present U.S. Utility Patent Application claims priority pursuant to 35 U.S.C. § 119(e) to U.S. Provisional Application No. 62/126,369, entitled "Spatial reuse clear to send (CTS) within wireless communications," filed Feb. 27, 2015, which is hereby incorporated herein by reference in its entirety and made part of the present U.S. Utility Patent Application for all purposes.

CONTINUATION-IN-PART (CIP) PRIORITY CLAIMS, 35 U.S.C. § 120

The present U.S. Utility Patent Application claims priority pursuant to 35 U.S.C. § 120, as a continuation-in-part (CIP), to U.S. Utility application Ser. No. 14/192,228, entitled "Channel sharing within wireless communications," filed Feb. 27, 2014, pending, which claims priority pursuant to 35 U.S.C. § 119(e) to U.S. Provisional Application No. 61/804,718, entitled "Channel sharing within single user, multiple user, multiple access, and/or MIMO wireless communications," filed Mar. 24, 2013; U.S. Provisional Application No. 61/888,873, entitled "Channel sharing within wireless communications," filed Oct. 9, 2013; and U.S. Provisional Application No. 61/936,158, entitled "Channel sharing within wireless communications," filed Feb. 5, 2014; all of which are hereby incorporated herein by reference in their entirety and made part of the present U.S. Utility Patent Application for all purposes.

INCORPORATION BY REFERENCE

The following U.S. Utility Patent Application is hereby incorporated herein by reference in its entirety and made part of the present U.S. Utility Patent Application for all purposes:

1. U.S. Utility patent application Ser. No. 15/054,778, entitled "Request to send (RTS) to group within wireless communications," filed concurrently on Feb. 26, 2016, pending.

BACKGROUND

Technical Field

The present disclosure relates generally to communication systems; and, more particularly, to clear to send (CTS) related communications within single user, multiple user, multiple access, and/or multiple-input-multiple-output (MIMO) wireless communications.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into radio frequency (RF) signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

As the number and density of wireless communication devices operating within wireless communications systems continue to grow, the present art does not provide adequate means by which the increasing numbers of wireless communication devices can operate successfully without interfering with one another successfully in such dense deployments. The present art does not provide adequate means by which communications may be effectively and efficiently supported within such situations.

BRIEF DESCRIPTION OF THE SEVERAL VIEWS OF THE DRAWINGS

FIG. 2A is a diagram illustrating an embodiment of dense deployment of wireless communication devices.

FIG. 2B is a diagram illustrating an example of communication between wireless communication devices.

FIG. 2C is a diagram illustrating another example of communication between wireless communication devices.

FIG. 3A is a diagram illustrating an example of orthogonal frequency division multiplexing (OFDM) and/or orthogonal frequency division multiple access (OFDMA).

FIG. 3B is a diagram illustrating another example of OFDM and/or OFDMA.

FIG. 3C is a diagram illustrating another example of OFDM and/or OFDMA.

FIG. 3D is a diagram illustrating another example of OFDM and/or OFDMA.

FIG. 3E is a diagram illustrating an example of single-carrier (SC) signaling.

FIG. 4A is a diagram illustrating another example of communication between wireless communication devices.

FIG. 4B is a diagram illustrating another example of communication between wireless communication devices.

FIG. 4C is a diagram illustrating another example of communication between wireless communication devices.

FIG. 4D is a diagram illustrating an example of a frame for use in wireless communications.

FIG. 4E is a diagram illustrating an example of a PLCP Protocol Data Unit (PPDU) sequence.

FIG. 6A is a diagram illustrating an example of least significant (LS) two bytes of spatial reuse (SR) CTS (SRCTS) receiver address (RA).

FIG. 6B is a diagram illustrating another example of LS two bytes of SRCTS RA.

FIG. 6C is a diagram illustrating an example of communications between wireless communication devices.

FIG. 6D is a diagram illustrating an example of at least a portion of spatial reuse (SR) CTS (SRCTS) based frame with wireless station (STA) identifier (STAID) field included.

FIG. 6E is a diagram illustrating an example of at least a portion of a SRCTS based frame with no STAID field included.

FIG. 7A is a diagram illustrating an embodiment of a method for execution by one or more wireless communication devices.

FIG. 7B is a diagram illustrating another embodiment of a method for execution by one or more wireless communication devices.

FIG. 7C is a diagram illustrating another embodiment of a method for execution by one or more wireless communication devices.

FIG. 7D is a diagram illustrating another embodiment of a method for execution by one or more wireless communication devices.

DETAILED DESCRIPTION

Figure 1:
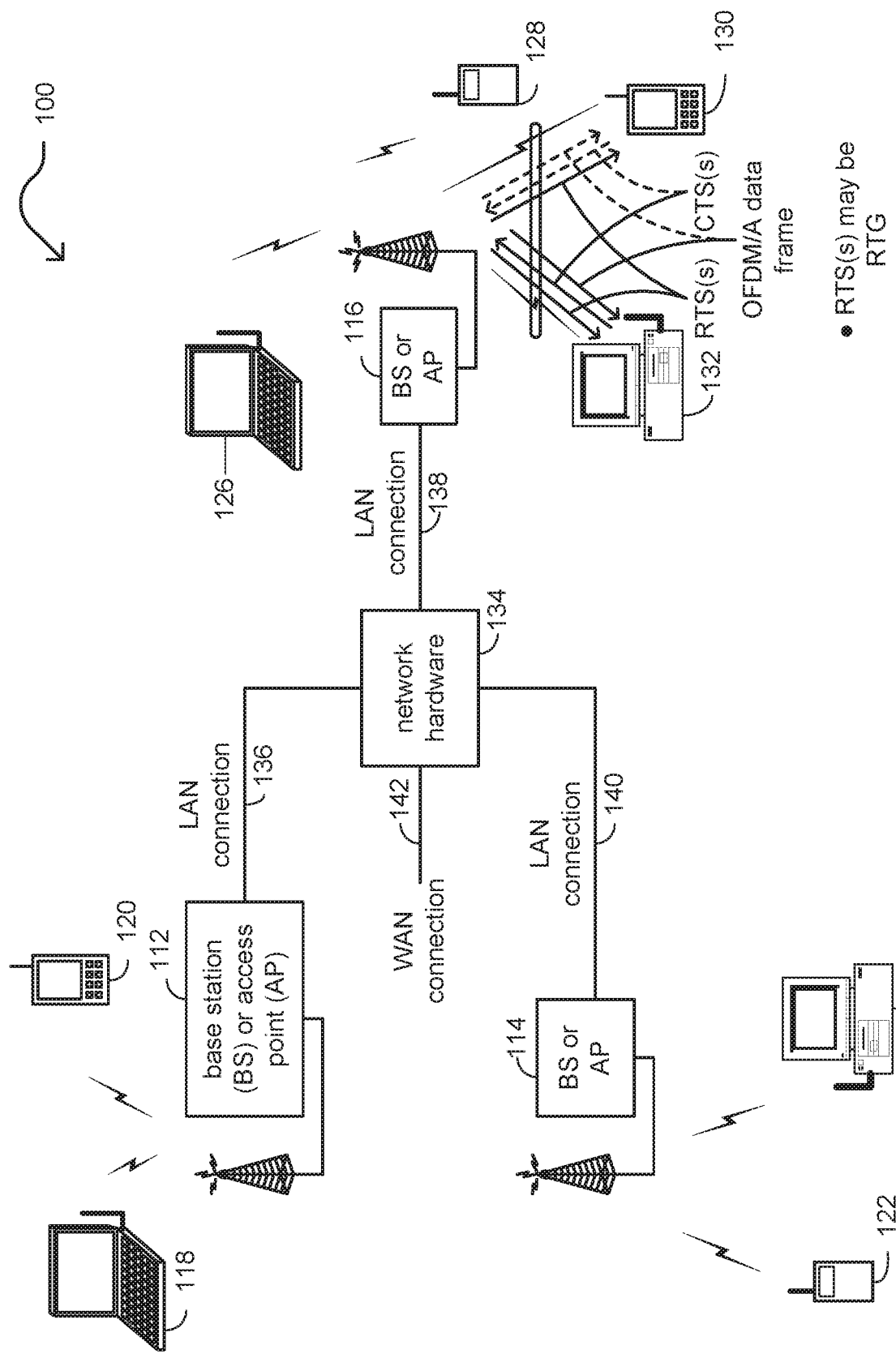
FIG. 1 is a diagram illustrating an embodiment of a wireless communication system.

FIG. 1 is a diagram illustrating an embodiment of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. Other examples of such wireless communication devices 118-132 could also or alternatively include other types of devices that include wireless communication capability. The details of an embodiment of such wireless communication devices are described in greater detail with reference to FIG. 2B among other diagrams.

Some examples of possible devices that may be implemented to operate in accordance with any of the various examples, embodiments, options, and/or their equivalents, etc. described herein may include, but are not limited by, appliances within homes, businesses, etc. such as refrigerators, microwaves, heaters, heating systems, air conditioners, air conditioning systems, lighting control systems, and/or any other types of appliances, etc.; meters such as for natural gas service, electrical service, water service, Internet service, cable and/or satellite television service, and/or any other types of metering purposes, etc.; devices wearable on a user or person including watches, monitors such as those that monitor activity level, bodily functions such as heartbeat, breathing, bodily activity, bodily motion or lack thereof, etc.; medical devices including intravenous (IV) medicine delivery monitoring and/or controlling devices, blood monitoring devices (e.g., glucose monitoring devices) and/or any other types of medical devices, etc.; premises monitoring devices such as movement detection/monitoring devices, door closed/ajar detection/monitoring devices, security/alarm system monitoring devices, and/or any other type of premises monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented to operate in accordance with any of the various examples, embodiments, options, and/or their equivalents, etc. described herein.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processing circuitry and/or a communication interface to support communications with any other of the wireless communication devices 118-132 and BSs or APs 112-116. In an example of operation, a processing circuitry and/or a communication interface implemented within one of the devices (e.g., any one of the WDEVs 118-132 and BSs or APs 112-116) is/are configured to process at least one signal received from and/or to generate at least one signal to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2A below, "device 210" when referring to "wireless communication device 210" or "WDEV 210," or "devices 210-234" when referring to "wireless communication devices 210-234"; or with respect to FIG. 2B below, use of "device 310" may alternatively be used when referring to "wireless communication device 310", or "devices 390 and 391 (or 390-391)" when referring to wireless communication devices 390 and 391 or WDEVs 390 and 391). Generally, such general references or designations of devices may be used interchangeably.

The processing circuitry and/or the communication interface of any one of the various devices, WDEVs 118-132 and BSs or APs 112-116, may be configured to support communications with any other of the various devices, WDEVs 118-132 and BSs or APs 112-116. Such communications may be uni-directional or bi-directional between devices. Also, such communications may be uni-directional between devices at one time and bi-directional between those devices at another time.

In an example, a device (e.g., any one of the WDEVs 118-132 and BSs or APs 112-116) includes a communication interface and/or a processing circuitry (and possibly other possible circuitries, components, elements, etc.) to support communications with other device(s) and to generate and process signals for such communications. The communication interface and/or the processing circuitry operate to perform various operations and functions to effectuate such communications (e.g., the communication interface and the processing circuitry may be configured to perform certain operation(s) in conjunction with one another, cooperatively, dependently with one another, etc. and other operation(s) separately, independently from one another, etc.). In some examples, such a processing circuitry includes all capability, functionality, and/or circuitry, etc. to perform such operations as described herein. In some other examples, such a communication interface includes all capability, functionality, and/or circuitry, etc. to perform such operations as described herein. In even other examples, such a processing circuitry and a communication interface include all capability, functionality, and/or circuitry, etc. to perform such operations as described herein, at least in part, cooperatively with one another. In an example of implementation and operation, WDEV 132 includes a processing circuitry that receives, from BS or AP 116, a request to send (RTS). In some examples, the RTS is modulated within a sub-channel of a communication channel, a subset of sub-carriers, etc. In some examples, the RTS can be an RTS that is not addressed specifically to any particular recipient, and in other examples, the RTS can be an RTS is intended for and addressed to one or more specific recipients. Alternatively, in some examples, the RTS received from the BS or AP 116 is a request to send (RTS) to group (RTG) frame that includes a first RTS intended for WDEV 132 and at least another RTS intended for another WDEV (e.g., a second RTS for WDEV 130).

WDEV 132 then processes the RTS to determine whether the RTS is intended for the WDEV 132 and whether the RTS includes a network allocation vector (NAV) having a non-zero value. Then, when WDEV 132 determines that the RTS is intended for it and the NAV of the RTS has the non-zero value, the WDEV 132 process one or more parameters associated with other communications between other wireless communication devices (e.g., communications between BS or AP 114 and WDEV 124) to determine whether communications between WDEV 132 and BS or AP 116 permissible. WDEV 132 determines whether such communications are permissible based on favorable comparison of one or more parameters to various one or more conditions, and when WDEV 132 determines that communications between WDEV 132 and BS or AP 114 are permissible, WDEV 132 generates and transmits a clear to send (CTS) to the first other wireless communication device. When certain condition(s) is/are not met, then such communications between WDEV 132 and BS or AP 114 are determined not to be permissible, and WDEV 132 does not transmit CTS to BS or AP 114. In some examples, WDEV 132 includes information within a transmitted CTS that identifies WDEV 132 to recipient(s) of the CTS.

In some examples, after WDEV 132 transmits the CTS to BS or AP 114, BS or AP 114 transmits data to WDEV 132. In one example, the BS or AP 114 transmits an orthogonal frequency division multiple access (OFDMA) frame that includes first data for WDEV 132 and second data for WDEV 130. In some examples, the first data is modulated within a first sub-channel (or first subset of sub-carriers) of a communication channel, and the second data is modulated within a second sub-channel (or second subset of sub-carriers) of a communication channel. These different sub-channels may be different sets of sub-carriers in an orthogonal frequency division multiplexing (OFDM) and/or orthogonal frequency division multiple access (OFDMA) application.

FIG. 2A is a diagram illustrating an embodiment 201 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, at least one additional AP or AP-operative STA may be deployed, such as WDEV 230 that communicates with WDEVs 232 and 234 that are STAs. The STAs may be any type of one or more wireless communication device types including wireless communication devices 118-132, and the APs or AP-operative STAs may be any type of one or more wireless communication devices including as BSs or APs 112-116. Different groups of the WDEVs 210-234 may be partitioned into different basic services sets (BSSs). In some instances, at least one of the WDEVs 210-234 are included within at least one overlapping basic services set (OBSS) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and APs are packed in a given area (e.g., which may be an area [indoor and/or outdoor] with a high density of devices, such as a train station, airport, stadium, building, shopping mall, arenas, convention centers, colleges, downtown city centers, etc. to name just some examples). Large numbers of devices operating within a given area can be problematic if not impossible using prior technologies.

As wireless communication systems continue to include more and more WDEVs and those WDEVs continue to be more and more densely deployed, newer mechanism and procedures are presented herein that allow for better and more efficient use of the communication medium. For example, concurrent transmissions may be made concurrently with other communications when determined to be permissible based on comparison of various parameters associated with communications within the system.

In environments with highly dense populations of WLAN nodes (e.g., such as with reference FIG. 2A), total offered load of traffic is high. Multiple WDEVs have many frames in their transmit buffers and are trying to access the medium to make their transmissions. In such situations, the communication medium is frequently busy. As a result of the high level of traffic from the many competing WDEVs.

Overlapping basic services set (OBSS) STAs compete with each other for control of the medium. The medium is shared among many BSSs through the carrier sense multiple access/collision avoidance (CSMA/CA) mechanism and distributed coordination function (DCF) and enhanced distributed channel access (EDCA). Only one pair of WDEVs may exchange data within an area where either of the WDEVs in that pair can be heard by other WDEVs. Some spatial sharing of the medium could be possible (e.g., if the rules to access the communication medium allowed it).

Existing rules of access prevent/discourage/limit spatial sharing opportunities. For example, only one pair is allowed to use the medium at a time. Efficiency gains to be obtained if spatial reuse opportunities can be exploited.

In an example of implementation and operation, WDEV 214 receives, from WDEV 210, a request to send (RTS). Such a RTS may be modulated within a sub-channel, subset of sub-carriers, etc. of a communication channel. WDEV 214 then processes the RTS to determine whether the RTS is intended for WDEV 214 and whether the RTS includes a network allocation vector (NAV) having a non-zero value. When WDEV 214 determines that the RTS is intended WDEV 214 and the NAV of the RTS has the non-zero value, WDEV 214 processes one or more parameters associated with other communications between other WDEVs (e.g., between WDEV 216 and WDEV 224) to determine whether communications between WDEV 214 and WDEV 210 are permissible. When it is determined that the communications between WDEV 214 and WDEV 210 are permissible (e.g., based on favorable comparison of the one or more parameters associated with other communications between other WDEVs), WDEV 214 generates and transmits a clear to send (CTS) to WDEV 210.

In another example of implementation and operation, WDEV 214 processes communications between other WDEVs (e.g., between WDEV 216 and WDEV 224) to determine one or more parameters associated with those communications either explicitly or implicitly. In some examples, those communications include information explicitly therein that are extracted and used by WDEV 214 to determine whether communications between WDEV 214 and WDEV 210 are permissible. Examples of such information that may be explicitly included within such communications may include any one or more of transmit power level of a transmission from WDEV 216, a transmit power level of a second transmission from WDEV 224, a receive power level of a transmission received by WDEV 216, a receive power level of a transmission received by WDEV 224, a signal to noise ratio (SNR) of a communication pathway between WDEV 216 and WDEV 224, a signal to interference noise ratio (SINR) of the communication pathway between WDEV 216 and WDEV 224, a margin of allowable interference for other communications that would not interfere with communications between WDEV 216 and WDEV 224, an actual value of allowable interference for other communications that would not interfere with communications between WDEV 216 and WDEV 224, etc., among other types of explicit information that may be include in such communications.

Alternatively, WDEV 214 processes communications between other WDEVs (e.g., between WDEV 216 and WDEV 224) to determine one or more parameters associated with those communications implicitly such as by processing a transmission from WDEV 216 to determine a receive power level of that transmission at WDEV 214, processing a transmission from WDEV 224 to determine a receive power level of that transmission at WDEV 214, estimate a receive power level of a transmission from WDEV 214 and received by WDEV 216 based on a receive power level of a communication received at WDEV 214 and based on reciprocity of a communication pathway between WDEV 214 and WDEV 216, estimate a receive power level of a transmission from WDEV 214 and received by WDEV 224 based on a receive power level of a communication received at WDEV 214 and based on reciprocity of a communication pathway between WDEV 214 and WDEV 224, among other parameters that may be.

In another example of implementation and operation, WDEV 214 receives, after transmission of the CTS to WDEV 210, a data frame from WDEV 210 during ongoing communications between WDEV 216 and WDEV 224.

FIG. 2B is a diagram illustrating an example 202 of communication between wireless communication devices. A wireless communication device 310 (e.g., which may be any one of devices 118-132 as with reference to FIG. 1) is in communication with another wireless communication device 390 (and/or any number of other wireless communication devices up through another wireless communication device 391) via a transmission medium. The wireless communication device 310 includes a communication interface 320 to perform transmitting and receiving of at least one signal, symbol, packet, frame, etc. (e.g., using a transmitter 322 and a receiver 324) (note that general reference to packet or frame may be used interchangeably).

Generally speaking, the communication interface 320 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the device 310 operates), equalization, pre-equalization, metric generation, symbol mapping and/or de-mapping, automatic gain control (AGC) operations, and/or any other operations that may be performed by an AFE and/or PHY component within a wireless communication device.

In some implementations, the wireless communication device 310 also includes a processing circuitry 330, and an associated memory 340, to execute various operations including interpreting at least one signal, symbol, packet, and/or frame transmitted to wireless communication device 390 and/or received from the wireless communication device 390 and/or wireless communication device 391. The wireless communication devices 310 and 390 (and/or 391) may be implemented using at least one integrated circuit in accordance with any desired configuration or combination of components, modules, etc. within at least one integrated circuit. Also, the wireless communication devices 310, 390, and/or 391 may each include one or more antennas for transmitting and/or receiving of at least one packet or frame (e.g., WDEV 390 may include m antennae, and WDEV 391 may include n antennae).

Also, in some examples, note that one or more of the processing circuitry 330, the communication interface 320 (including the TX 322 and/or RX 324 thereof), and/or the memory 340 may be implemented in one or more "processing modules," "processing circuits," "processors," and/or "processing units" or their equivalents. Considering one example, one processing circuitry 330a may be implemented to include the processing circuitry 330, the communication interface 320 (including the TX 322 and/or RX 324 thereof), and the memory 340. Considering another example, two or more processing circuitries may be implemented to include the processing circuitry 330, the communication interface 320 (including the TX 322 and/or RX 324 thereof), and the memory 340. In such examples, such a "processing circuitry" or "processing circuitries" (or "processor" or "processors") is/are configured to perform various operations, functions, communications, etc. as described herein. In general, the various elements, components, etc.

shown within the device 310 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the device 310 includes both processing circuitry 330 and communication interface 320 configured to perform various operations. In other examples, the device 310 includes processing circuitry 330a configured to perform various operations. Generally, such operations include generating, transmitting, etc. signals intended for one or more other devices (e.g., device 390 through 391) and receiving, processing, etc. other signals received for one or more other devices (e.g., device 390 through 391).

FIG. 2C is a diagram illustrating another example 203 of communication between wireless communication devices. In this example 203, WDEV 310 performs a frame exchange process with device and the WDEV 390 and/or the WDEV 391 including an RTG transmitted to WDEV 390 and the WDEV 391 at or during a first time or time period (e.g., time 1, ΔT1, etc.), at least one CTS received from the WDEV 390 and/or the WDEV 391 at or during a second time or time period (e.g., time 2, ΔT2, etc.), and an OFDMA date frame transmitted to the WDEV 390 and/or the WDEV 391 at or during a third time or time period (e.g., time 3, ΔT3, etc.).

In another example of implementation and operation, the WDEV 310 (or WDEVs 390, 391, etc.) includes both a processing circuitry to perform many of the operations described above and also includes a communication interface, coupled to the processing circuitry, that is configured to support communications within a satellite communication system, a wireless communication system, a wired communication system, a fiber-optic communication system, and/or a mobile communication system.

FIG. 3A is a diagram illustrating an example 301 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Note that sub-carrier or tone may be used interchangeably. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processing circuitry and the communication interface of a communication device may be configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 3B is a diagram illustrating another example 302 of OFDM and/or OFDMA. A transmitting device transmits modulation symbols via the sub-carriers. Note that such modulation symbols may include data modulation symbols, pilot modulation symbols (e.g., for use in channel estimation, characterization, etc.) and/or other types of modulation symbols (e.g., with other types of information included therein). OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a cyclic prefix (CP) and/or cyclic suffix (CS) (shown in right hand side of FIG. 3A) that may be a copy of the CP may also be employed within the guard interval to allow switching time (e.g., such as when jumping to a new communication channel or sub-channel) and to help maintain orthogonality of the OFDM and/or OFDMA symbols. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 3C.

FIG. 3C is a diagram illustrating another example 303 of OFDM and/or OFDMA.

Comparing OFDMA to OFDM, OFDMA is a multi-user version of the popular orthogonal frequency division multiplexing (OFDM) digital modulation scheme. Multiple access is achieved in OFDMA by assigning subsets of sub-carriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or superframe (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 3C shows example 303 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 3D is a diagram illustrating another example 304 of OFDM and/or OFDMA. In this example 304, the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

FIG. 3E is a diagram illustrating an example 305 of single-carrier (SC) signaling. SC signaling, when compared to OFDM signaling, includes a singular relatively wide channel across which signals are transmitted. In contrast, in OFDM, multiple narrowband sub-carriers or narrowband sub-channels span the available frequency range, bandwidth, or spectrum across which signals are transmitted within the narrowband sub-carriers or narrowband sub-channels.

Generally, a communication device may be configured to include a processing circuitry and the communication interface (or alternatively a processing circuitry, such a processing circuitry 330a shown in FIG. 2B) configured to process received OFDM and/or OFDMA symbols and/or frames (and/or SC symbols and/or frames) and to generate such OFDM and/or OFDMA symbols and/or frames (and/or SC symbols and/or frames).

In certain of the following examples, diagrams, etc., a wireless communication device referred to as A is wireless communication device A (WDEV_A), B is wireless communication device B (WDEV_B), and so on.

FIG. 4A is a diagram illustrating another example 401 of communication between wireless communication devices. Novel mechanisms presented herein allow C to transmit on top of the ongoing A→B transmission under certain conditions. C and/or D is/are configured to process one or more parameters associated with communications between A and B, and when there is favorable comparison of those one or more parameters with one or more considerations, then C determines it is permissible to transmit to D even if there are ongoing communications between A and B.

Generally speaking, a transmission begins from device A to B (e.g., from WDEV_A to WDEV_B). Communications described from A to B (or A→B) may be understood as being from WDEV_A to WDEV_B. Similar suffix conventions may be used as well (e.g., communications described from C to D may be understood as being from WDEV_C to WDEV_D, and so on). Nearby devices such as device C (and not devices A/B) will begin decoding the A→B signal (packet or frame), and these nearby devices may also have decoded frames that were optionally used to setup the A→B link (e.g., a request to send/clear to send (RTS/CTS) exchange). The setup frames and/or the headers (PHY & MAC) in the A→B frame contain information that allow such a nearby device to determine various things such as (a) how interference resilient the A→B frame is, and (b) how strongly this device will interfere with the A→B link if it begins transmitting. Some of this "information" will already be contained in standard frame headers and certain exchanged frames (e.g., RTS/CTS frames). Based on above information it has extracted from the A→B header and other frames, plus the power at which it received the A→B header and of other frames, a nearby device C may begin transmitting (on top of, i.e., simultaneously to, the A→B link) to another nearby device D, possibly subject to certain conditions.

Alternatively or in addition to, C and/or D may determine certain parameters associated with communications between A and B implicitly based on analysis of those communications. In some examples, information is included explicitly within the communications between A and B and may then be extracted by C and/or D. In other examples, C and/or D process/processes the communications to determine certain characteristics of those communications to determine such information implicitly. In other examples, C and/or D determines certain parameters associated with communications between A and B implicitly and based on information is included explicitly within the communications between A and B.

A processing circuitry within device C may be configured to process communication between A and B to determine the one or more concurrent transmission parameters that includes a concurrent transmission start time. The information determined based on the communication between A and B may indicate a particular time at which the device C should begin its concurrent transmission. The processing circuitry within device C may then be configured direct the communication interface to transmit the second signal during receipt of a signal from A to B and to begin transmission of the signal based on the concurrent transmission start time. In some instances, the one or more concurrent transmission parameters may include a concurrent transmission end time that indicates when the concurrent transmission should end.

FIG. 4B is a diagram illustrating another example 402 of communication between wireless communication devices. This diagram shows that the concurrent transmission from device C to D ends before the transmission from device A to B.

FIG. 4C is a diagram illustrating another example 403 of communication between wireless communication devices. This diagram shows that the concurrent transmission from device C to D ends at the same time as the transmission from device A to B.

Referring back to FIG. 4A, that diagram shows that the concurrent transmission from device C to D ends after the transmission from device A to B. Concurrent transmission start and end times are just some examples of concurrent transmission parameters that may be determined based on the communications between A and B.

Among consideration of other parameters, consideration of transmission power may also be made. For example, consider that device C overhears the A→B header and determines that if it transmits with 10 dBm power because such a transmission will cause negligible interference to A and B, and then device C may began a transmission to some other device D. In another example, consider that device C has previously reached an agreement with device A that allows C to transmit on top of any A transmission (e.g., such as during some prior frame exchange between those devices, such as an RTS/CTS frame exchange). Then, device C overhears A→B header, and device C is allowed to transmit based on this agreement, and thus C begins transmitting to D.

FIG. 4D is a diagram illustrating an example 404 of a frame for use in wireless communications. Generally speaking, a frame employed within such wireless communications includes the following basic components: media access control (MAC) header, a variable length frame body, and a frame check sequence (FCS). In certain embodiments, the MAC header includes fields for each of frame control (FC), duration (DUR/ID), address (e.g., receiver and/or transmitter addresses), sequence control information, optional Quality of Service (QoS) Control information (e.g., for QoS data frames only), and HT Control fields (+HTC frames only) (optional fields). Note that such a frame structure is illustrative and an example of such a frame structure as may be used herein, and alternative embodiments of frame structures may also be employed.

In one example of operation (e.g., such as based on certain prior modes of operation), when WDEV receives an RTS that has a non-zero value in its network allocation vector (NAV), then the WDEV does not transmit any CTS in response to the reception of the RTS. This discourages spatial reuse (SR). In another example of operation based on novel Alternatively, this disclosure new modes of operation that allow for spatial reuse (SR) CTS (SRCTS) response rules such that when a first WDEV (STAx) an RTS is received from a second WDEV (STAw), then when the first WDEV (STAx) is an intended recipient of the RTS frame, the first WDEV (STAx) can send a CTS in response even if its NAV has a non-zero value because of some other ongoing exchange between other WDEVs (e.g., STAy and STAz) and based on favorable comparison of one or more parameters to one or more conditions. For example, the STAx may respond with a CTS if one or more conditions are met.

Certain examples are described below based on communications between various WDEVs (e.g., STAx and STAw that are involved in a possible RTS, CTS, data exchange, and STAy and STAz that are involved in other communications). Examples of some conditions that may be used for comparison to determine whether such communications are permissible include those listed as follows:

1. The received frame having a non-zero valued NAV at STAx was not from a STA associated with the BSS of this STAx (e.g., color of the frame does not match the color of BSS of this STAx, e.g., other information is used to determine that a frame exchange is occurring in an OBSS—e.g. MAC RA, TA, BSSID information. Color is specified based on physical layer (PHY) information that identifies those WDEVs included in the BSS).

2. The received frame having a non-zero valued NAV at STAx had a receive energy level below a threshold CTS reply dBm (e.g., transmission of a Spatial Reuse CTS=SRCTS is allowed in this case).

3. The CTS that is transmitted includes a value which is the level of interference which is likely to be experienced during the reception of the subsequent DATA PPDU (e.g., a number of dB added to a noise floor).

4. The STAx determines from other information that the interference its frame exchange will create at STAy and STAz is not likely to cause problems (e.g., based on explicitly available and/or implicitly determined information), for example:

4.1 STAx uses receive power measured from frames transmitted by STAy and STAz to estimate the received power and interference STAx will create at STAy and STAz locations.

4.2 STAx obtains information from STAw regarding the expected level of interference a transmission from STAw will create at STAy and STAz 4.3 STAx observes the rate or MCS of the frames being exchanged between STAy and STAz and/or a margin of operation value in those frames to determine an approximate margin of operation between STAy and STAz and combines this with its prediction of its interference level at STAy and STAz when it is transmitting and when STAw is transmitting 4.4 STAx obtains information such as a table of operation indicating receive power information or signal to noise ratio (SNR) or signal to interference noise ratio (SINR) information for all paths between STAw, STAx, STAy, and STAz and uses this information to determine, for example, if the interference generated by STAx and STAw transmission's will cause failures for STAy and STAz frame exchanges 5. Alternatively, the current frame on the air transmitted by STAy is an HE PPDU that included an interference level indication and the HE PPDU is being received below that interference level at STAx. STAx must determine if STAw will be received by STAy at or below this interference level before sending a CTS.

FIG. 4E is a diagram illustrating an example 405 of a PLCP Protocol Data Unit (PPDU) sequence. STAy transmits a RTS, and STAz responds with a SRCTS (or a CTS). Then, STAy transmits a data frame that includes data intended for STAz after receiving the SRCTS (or CTS) from STAz. While the data frame is being transmitted from STAy to STAz, STAw transmits a RTS to STAx (or request to send to group (RTS to RTG) that is addressed to and/or received by STAx) and receives a SRCTS (or a CTS) from STAx. Then, STAx transmits a data frame that includes data intended for STAx after receiving the SRCTS (or CTS) from STAz. After STAz receives the data frame transmission from STAy, the STAz transmits a response (e.g., an acknowledgement (ACK), a block acknowledgement (BACK) such as shown by BA, etc.) to STAy. Similarly, after STAx receives the data frame transmission from STAw, the STAx transmits a response (e.g., ACK, BA, etc.) to STAw.

Figures 5A, 5B:
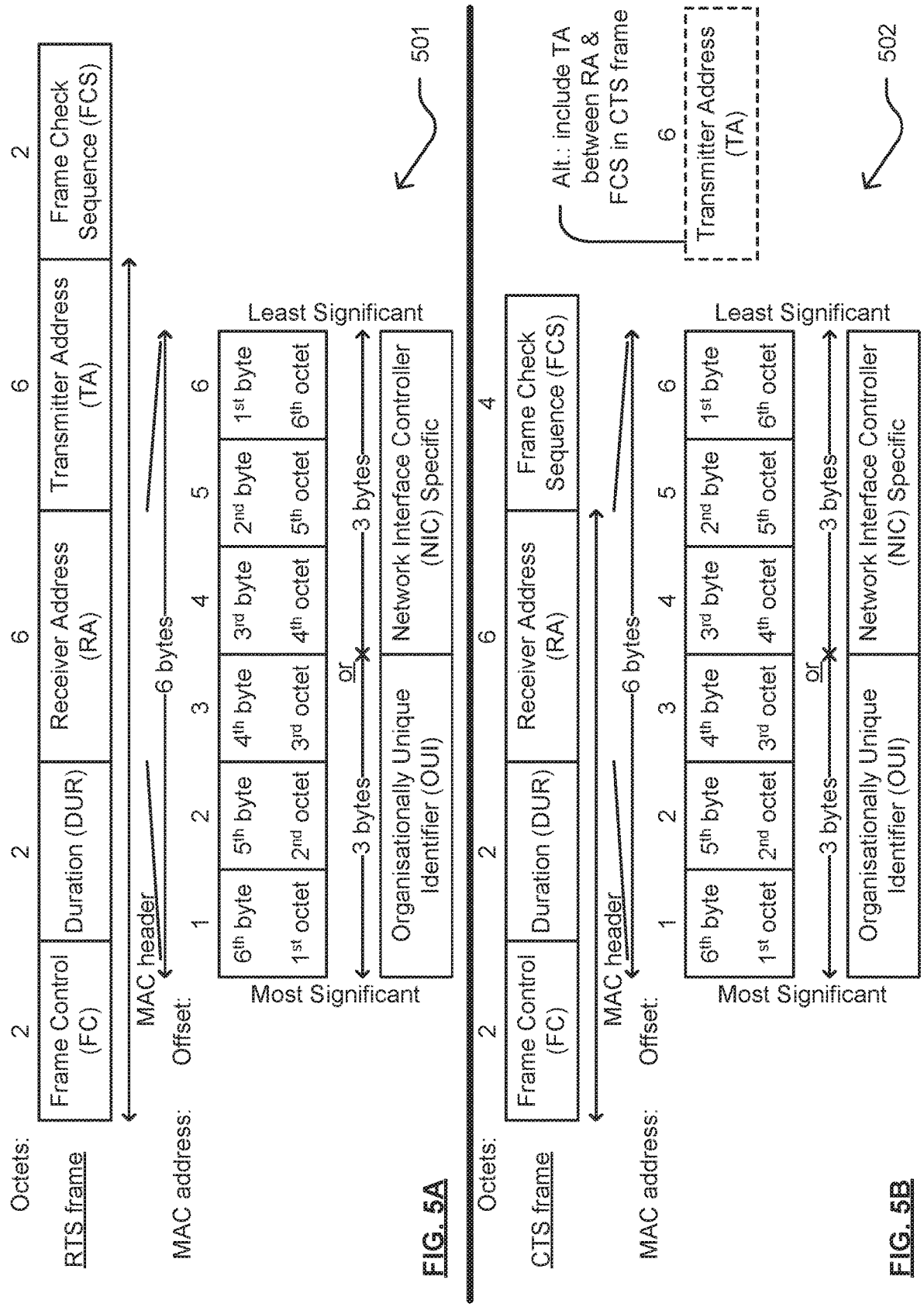
FIG. 5A is a diagram illustrating an example of a request to send (RTS) frame format.
FIG. 5B is a diagram illustrating an example of a clear to send (CTS) frame format.

FIG. 5A is a diagram illustrating an example 501 of a request to send (RTS) frame format. Such an RTS as described in this diagram includes a FC, DUR, RA, TA, and FCS fields and can be understood generally with reference to the format of FIG. 4D. The receiver address (RA) address field of RTS to Group includes group information. The Organisationally Unique Identifier (OUI) portion of the RA field address contains a signaling OUI value that is used only for the purpose of indicating that the RTS is an RTS to Group. The remaining 24 bits (e.g., Network Interface Controller (NIC) Specific portion) may contain various contents including GroupID/AID range indicator field and Group ID or AID range.

STAs that are addressed either through the GroupID value or the AID range value respond with CTS. GroupID is a numerical value corresponding to a group of STA which has membership as defined in a previous management exchange (e.g., such as based on a previously communicated Group Definition Field). If AID range is provided, then each recipient STA examines the range to see if it has an AID assigned to itself which is within the given range. The STAs identifying themselves either as members of the identified group or within the AID range will respond with a CTS. CTS RA and DUR fields are determined from RTS to Group. The RTS Transmitter Address (TA) value becomes CTS RA value. The RTS DUR value is reduced by SIFS and CTS PPDU duration to fill CTS DUR field.

FIG. 5B is a diagram illustrating an example 502 of a clear to send (CTS) frame format. Such a CTS as described in this diagram includes a FC, DUR, RA, and FCS fields and can be understood generally with reference to the format of FIG. 4D. In some alternative examples, the CTS may also include a TA field between RA and FCS to indicate from which WDEV the CTS has been transmitted and can have certain similarities to the RTS frame format of FIG. 5A. For example, such a CTS may include an OUI portion, a NIC Specific portion, etc. to implemented the MAC address such as with respect to the RTS described above with respect to FIG. 5A.

An example of behavior of the RTS transmitter is described below. Consider that a RTS transmitter, e.g., STA0, has sent an RTS. If there is no CTS received in response, the RTS transmitter does not continue the exchange, as in normal RTS behavior described in IEEE 802.11 rules.

If the RTS transmitter STA0 receives a CTS (or SRCTS) at short interframe space (SIFS) after the RTS, then the STA0 examines the RA field of the CTS (or SRCTS). If the RA field matches the STA0 48-bit MAC address, then the CTS is a normal CTS, and STA0 follows the normal rules of IEEE 802.11. Alternatively, if the RA field does not match STA0 48-bit MAC address, then STA0 examines the most significant 3 octets of the RA to see if they match the SRCTS_OUI (e.g., the most significant 3 bytes as shown in FIG. 5B). If they do not match, then the CTS is a normal CTS and STA0 follows the normal rules of IEEE 802.11. If the 3 bytes match SRCTS_OUI, then the CTS is an SRCTS and STA0 shall determine appropriate rate/modulation coding set (MCS) for transmission.

A specific example of rate/Modulation Coding Set (MCS) selection for transmission of a PLCP Protocol Data Unit (PPDU) is provided below. If the RTS transmitter STA0 receives an SRCTS from STAn on channel x. For example, consider that the receive power level of the CTS (or SRCTS) from STAn is −70 dBm. Consider that the CTS (or SRCTS) RA field information indicates an interference level of +10 dB above noise. Consider that the noise floor is −95 dBm, previously communicated pseudo-static information or the local average noise floor expected to be observed at the recipient. Consider that the STA0 TX power is +4 dB above STAn TX power, previously communicated pseudo-static information. Consider that the STA0 chooses a rate that will yield a packet error rate of P % based on expected packet error rate (PER) at SINR of −70+4−(−95+10)=19 dB. Note that P % is error rate of STAg choice, e.g. 10%. Signal to interference noise ratio (SINR) to packet error rate (PER)/frame error rate (FER)/is determined through pre-computed performance of modulation technique and expected channel conditions combined with packet length in bits and any coding gain. If no rate meets the conditions as based on comparisons to the determined, predicted, measured, inferred, etc. operating conditions of certain communications within the system, then STA0 does not transmit.

An example of a new frame format for a spatial reuse (SR) CTS (SRCTS) frame is presented below. Generally, such a SRCTS may be viewed as having a frame with some similarities to the CTS of FIG. 5B (e.g., such as including FC, DUR, and RA fields). In one possible example, the SRCTS frame has the following fields:

1. FC=Frame Control=2 octets (e.g., this field is unchanged from a normal CTS such as based on FIG. 5B)

2. DUR=duration=2 octets (e.g., this field is unchanged from a normal CTS such as based on FIG. 5B)

3. RA=Receiver Address=6 octets. In a normal CTS, this field holds the CTS intended recipient address. Because the recipient of a CTS only expects a CTS when it has transmitted an RTS, the RA value is rather redundant and can be used for other purposes in some applications. In a SRCTS, the RA value is 6 octets total. The most significant (MS) 3 octets of the RA may be implemented to include: OUI_S-RCTS (Organizationally Unique Identifier for SRCTS), and the OUI value=OUI_SRCTS is never used for the address of a WLAN device and therefore, any RA value that includes OUI_SRCTS will never match any $3^{rd}$ party recipient. The $6^{th}$ byte of the RA contains the $6^{th}$ byte of the TA of the RTS, and the $4^{th}$ and $5^{th}$ bytes of the RA contents.

FIG. 6A is a diagram illustrating an example 601 of least significant (LS) two bytes of spatial reuse (SR) CTS (SRCTS) receiver address (RA). In an alternative 1, SRCTS least significant (LS) two bytes may contain the following:

1. Association ID (AID) or partial AID of SRCTS transmitter

2. INTF field: Current or average interference level at SRCTS transmitter location (e.g., the number of dB of interference above the noise floor, and where noise floor can be a previously agreed upon value, e.g. −95 dBm or simply the noise floor determined by the SRCTS transmitter). Note that the interference level simply represents a number of dB of expected impairment or interference over a baseline value. The baseline value could be a long term average established by the SRCTS transmitter. The baseline value could be a previously agreed upon value, e.g. −95 dBm.

FIG. 6B is a diagram illustrating another example 602 of LS two bytes of SRCTS RA. In an alternative 2, SRCTS least significant (LS) two bytes contain the following:

1. Duration value (DUR)—time duration of expected interference level. The expected duration of the indicated interference level, for example, if an overlapping reception is occurring at the CTS transmitter location, then this field could contain the duration of time during which that interference level is expected to be experienced based on the duration of the ongoing reception indicated in the overlapping PPDU (e.g., inside of the PHY header of the interfering PPDU).

2. INTF field: Current or average interference level at SRCTS transmitter location (e.g., number of dB of interference above the noise floor as previously described). Note that the exact bit count of the fields is flexible and may be different in some examples than that which is shown in the diagram.

In an alternative 3, the SRCTS format may be based on the following:

The 4th byte of the RA may be configured to contain Bits 1-0 specifies <version>: 2 bits (e.g., with a value in range 0-3).

When bits 1-0 have the value 0, then:

1. Bits 4-2 specifies ⟨category⟩:

3 bits (e.g., with a value in range 0-7).

= 0: gmode protection

= 1: calibration

= 2: coex(*BTCX*, *LTECX*, *WLCX*)

= 3: OBSS bandwidth (*bw*) protection

= 4: Interference level included

= 5-7: reserved

Bits 7-5 may be used to specify additional information (e.g., when category=interference level included, additional information=dB of expected interference at the SRCTS transmitter location divided by some number, e.g., 4).

When bits 1-0 have the value not equal to 0, then the remaining bits are reserved and are set to 0. A recipient (e.g., receiver WDEV, STA) ignores the values of these bits. Note that future revisions might set these bits to 1, so the bits are always ignored by devices that are unaware of the encoding of these bits when 1-0 have values 1 through 3.

FIG. 6C is a diagram illustrating an example 603 of communications between wireless communication devices. This example operation may be viewed as an alternative 4. In some examples of operation, a given RTS transmitter could receive a CTS (or SRCTS) from the wrong transmitter and therefore incorrectly assume that the receipt thereof makes a subsequent data transmission permissible when that given RTS transmitter is not necessarily an intended recipient of the CTS (or SRCTS) thereby leading to CTS (or SRCTS) confusion.

Consider the example 603 of this diagram, consider AP1 and AP2 choose the same backoff and both start counting at the end of a transmission from S3 (e.g., STA3). Then consider that AP1 and AP2 start RTS transmissions at the same time. S1 (e.g., STA1) detects AP1's RTS over the AP2 RTS because d1<d12. S2 (e.g., STA2) detects nothing because of interference from S5 (e.g., STA5). S1 responds with SRCTS. AP2 detects S1 SRCTS but cannot tell whether it is from S2 (e.g., because CTS (or SRCTS) is not uniquely identifiable, then AP2 is confused).

With respect to an alternative CTS frame format adapted for the alternative 4, this frame may have a type and subtype that uniquely identify it as different from the normal CTS frame, and it could be labeled as a SRCTS. For example, the RA field may be implemented as a normal RA value (e.g., as described in IEEE 802.11 DRAFT P802.11REVmc_D3.0.pdf for CTS) so as to prevent SRCTS confusion.

The following additional fields may be included in such an alternative CTS, which is a SRCTS frame format:

1. INTF field: Current or average interference level at SRCTS transmitter location (e.g., number of dB of interference above a baseline value). The baseline value may be a previously agreed upon value (e.g., −95 dBm or simply the noise floor determined by the SRCTS transmitter). Note that the interference level may simply represent a number of dB of expected impairment or interference over the baseline value. The baseline value could be a long term average established by the SRCTS transmitter.

2. Duration value—time duration when the expected interference level is valid. The expected duration of the indicated interference level, for example, if an overlapping reception is occurring at the CTS transmitter location, then this field could contain the duration of time during which that interference level is expected to be experienced based on the duration of the ongoing reception indicated in the overlapping PPDU, e.g. inside of the PHY header of the interfering PPDU.

SRCTS may additionally contain another field as follows:

STAID=Address information of the SRCTS transmitter. This may include some number of bits of association ID (AID). This allows the SRCTS transmitter to be uniquely identified by RA+AID combination by $3^{rd}$ party STAs (e.g., full 48-bit address of the SRCTS transmitter).

The SRCTS may be variable in length and may be implemented to contain additional information. A length field can be included, or one of the subfields of the SRCTS may contain an extension bit that indicates that additional bytes are present (e.g., most significant bit (MSB) of INTF field (i.e. INTF[7]) is converted to an extension bit and the interference value is contained in INTF[6:0]).

The following example frame formats provided below have some similarities to the frame format of FIG. 4D (e.g., including FC, DUR, RA, FCS fields). These examples include the INTF field as described above and the STAID field and are based on the examples byte allocations as shown as shown in the diagrams. Note that different bit, byte, etc. allocations may be implemented in other examples without departing from the scope and spirit of the invention.

FIG. 6D is a diagram illustrating an example 604 of at least a portion of spatial reuse (SR) CTS (SRCTS) based frame with STAID (Address information of the SRCTS transmitter) field included.

FIG. 6E is a diagram illustrating an example 605 of at least a portion of spatial reuse (SR) CTS (SRCTS) based frame with no STAID field included.

An alternative exchange can involve a RTS response that can be either CTS or SRCTS. The RTS recipient then operates to decide if it should respond with a normal CTS or a new SRCTS. Note that the choice depends on RTS Transmitter address (TA) value. Some RTS transmitters will understand and accept SRCTS as a response to RTS. Some RTS transmitters will not accept SRCTS (e.g., legacy, older devices not configured to detect and process such new SRCTSs). This may require a lookup of the TA. In some examples, this might be considered burdensome to lookup TA of RTS before responding.

Note that such a choice also depends on other factors. For example, a RTS recipient might decide it does not want to send SRCTS for other reasons. This may be made to limit spatial reuse to decrease PER during DATA phase.

In some examples, an alternative to avoid TA lookup to determine response is based on a new frame format and type of RTS such as a spatial reuse (SR) RTS (SRRTS). A particular type and subtype are used to define this new frame subtype. In one example, all fields of SRRTS would be the same as RTS with the exception that the value in the subtype field is different and explicitly identifies the frame as a SRRTS instead of a RTS. In one example of operation, a response to SRRTS would be SRCTS (e.g., analogously that a response to RTS is CTS). No TA lookup would be necessary, and response is predicated on appropriate identification of SRRTS as opposed to RTS by examining type and subtype values.

Various other examples of possible modes of operation are described below. In general, even when a WDEV (e.g., STA0) receives a RTS (or RTG) intended for it from another WDEV (e.g., STA1), and even when the WDEV determines that the NAV of the RTS has the non-zero value, the NAV processes one or more parameters associated with other communications between other WDEVs (e.g., STA2 and STA 3) to determine whether communications between that WDEV (e.g., STA0) and the other WDEV (e.g., STA1) are permissible. In some examples, the considerations are based on whether or not the communications between that WDEV (e.g., STA0) and the other WDEV (e.g., STA1) can be successfully made without interfering with the other communications between the other WDEVs (e.g., STA2 and STA 3). For example, if parameters by which the communications between that WDEV (e.g., STA0) and the other WDEV (e.g., STA1) are to be made can be made successfully without interfering with the other communications between the other WDEVs (e.g., STA2 and STA 3), then the communications between that WDEV (e.g., STA0) and the other WDEV (e.g., STA1) are permissible. Alternatively, they are impermissible.

Also, such information may be determined implicitly and/or based on explicitly. In one example, the WDEV (e.g., STA0) processes content within certain communications detected and received to extract explicit information included therein related to parameters associated with other communications. In some examples, parameters that may be explicitly specified by information included within communications may include a transmit power level of a transmission from another wireless communication device, a receive power level of a transmission received by another wireless communication device, a signal to noise ratio (SNR) of a communication pathway between other wireless communication devices, a signal to interference noise ratio (SINR) of the communication pathway between other wireless communication devices, etc. among other parameters associated with communications between wireless communication devices.

In another example, the WDEV (e.g., STA0) processes communications detected and received to determine certain parameters associated with those communications. In such an example, the WDEV (e.g., STA0) determines parameters such as those described above that may be explicitly included within communications. In an example of operation, the WDEV (e.g., STA0) calculates the receive power level of a transmission it receives. Based on principles of reciprocity, the WDEV (e.g., STA0) can estimate the transmitted power level of that transmission based on an estimate of a communication pathway between it and another wireless communication device. Also, the WDEV (e.g., STA0) can be configured to estimate various characteristics of communication pathways between it and other wireless communication devices (e.g., SNR, SINR, channel estimation, etc.).

Various examples by which such analysis, processing, and determination may be performed are provide for the assistance of the reader. As described above, such examples below are described with reference to multiple (e.g., STAx and STAw involved in a first group such a first BSS and STAy and STAz involved in a second group such a second BSS).

The following example of operation may be viewed as an alternative 5. Consider that STAy sends RTS to STAz. STAz sends CTS to STAy. STAy records the receive power level (RXPWR) of CTS and SINR of CTS. STAx records RXPWR of CTS if STAy and STAz are not members of the same BSS as STAx. STAy calculates excess margin for DATA reception at STAz location assuming SINR of CTS is same as SINR of DATA at STAz (e.g., based on principles of reciprocity). Note that the DATA MCS can be different than CTS MCS and this affects excess margin. For example, CTS SINR might be 35 dB, SINR necessary for MCS9 for DATA might be 30, if so, then excess is 5 dB. STAy includes excess margin as an Interference value in the PHY header of the DATA transmission.

STAx estimates its level of interference at STAz based on previously recorded CTS RXPWR, e.g., STAx interference at STAz=CTS RXPWR. If CTS RXPWR minus STAx noise floor<excess margin indicated in the DATA frame, then STAx may terminate reception of the DATA frame after PHY header reception. STAx PHY signal field input to clear channel assessment (CCA) now indicates medium=IDLE. Other conditions might maintain CCA=BUSY, e.g. NAV<>0, energy detect (ED)>threshold. If all STAx CCA conditions indicate IDLE, then STAx continues normal backoff process and if it reaches ZERO, then STAx may transmit.

The following example of operation may be viewed as an alternative 6. Consider that this alternative 6 is similar to alternative 5 with at least the following exceptions. CTS transmitted by STAz contains an additional field that indicates the level of interference that is tolerable for the received RTS that generated the CTS transmission (e.g., CTS explicitly includes information that can be determined by processing those communications). This additional field may be Tolerable_interference that specifies the actual power level of the received RTS minus a pre-agreed required SINR for the MCS of the received RTS (e.g., −65 dBm−10 dB=−75 dBm). The tolerable interference may be viewed as an absolute level of power. The noise floor could be pre-agreed by all devices within a BSS. For example, the noise floor could be set by the AP of the BSS and communicated through a management frame. Alternatively, the noise floor could by a single fixed pre-agreed value for all wireless communication devices in the BSS.

The following example of operation may be viewed as an alternative 6b. In this example, the CTS contains RXPWR level of RTS reception (e.g., CTS explicitly includes information that can be determined by processing those communications). DATA transmission repeats RXPWR level from CTS inside of DATA frame PHY header. Then, a bit in PHY header indicates whether RXPWR field is report or re-use frame.

Note that STAx may track the duration of the reception terminated DATA frame and limit any STAx transmission to remain within the bounds of that terminated DATA frame.

The following example of operation may be viewed as an alternative 7. Consider that this alternative 7 is similar to alternative 5 with at least the following exceptions. CTS is a normal frame, and it does not include any reported information. STAy includes RXPWR of CTS (e.g., explicitly included information but includes RXPWR instead of interference value) and the MCS of the DATA frame in the DATA frame. STAx calculates minimum SINR (MIN_SINR) needed at STAz. This may be calculated based on MCS of DATA frame (e.g., based on considering a lookup table that produces MIN_SINR(MCS)).

Then, STAx calculates SINR available at STAz if STAx transmits. The available SINR value (SINR_AVAIL) may be determined as the DATA frame RXPWR field value minus STAx recorded CTS RXPWR. If SINR_AVAIL>MIN_SINR(MCS), then STAx can ignore this frame for CCA purposes.

The following example of operation may be viewed as an alternative 8. Consider that STAr sends RTS to STAc. STAc receives RTS. Then, STAc transmits CTS to STAr. STAr receives CTS and records RXPWR (STAr CTS RXPWR). STAx receives CTS and records RXPWR (STAx CTS RXPWR).

Then, STAr transmits DATA with CTS RXPWR in PHY header field INTF. STAx receives DATA frame. STAx calculates the required SNR (SNRreq) as the required SNR for MCS of DATA frame. This could be based on a pre-agreed lookup table reference. Then, the STAx makes the following comparison: if STAx CTS RXPWR<(INTF−SNRreq), then it discards the DATA frame and continues backoff process.

The following example of operation may be viewed as an alternative 8a. Consider that this alternative 8a is similar to alternative 8 with at least the following exceptions. STAr sends value of the difference between the STAr CTS RXPWR and the required SNR (STAr CTS RXPWR−SNRreq) in the INTF field of the PHY header of the DATA frame, which allows finer adjustment of SNRreq. For example, in a finite precision system with a finite number of bits, expression of a smaller number with a same number of bits allows for improved granularity and precision. Then, the STAx makes the following comparison: STAx tests: If CTS STAx RXPWR<INTF field value, then it discards DATA frame and continue backoff process.

The following example of operation may be viewed as an alternative 9. Consider that this alternative 9 is similar to alternative 8 with at least the following exceptions. STAc includes RTS RXPWR value in CTS with new field to hold this RXPWR value (e.g., explicitly included information). STAr places CTS field RXPWR value into DATA frame (e.g., explicitly included information). Other details are similar as within alternative 8.

The following example of operation may be viewed as an alternative 9a. Consider that this alternative 9a is similar to alternative 8a with at least the following exceptions. STAc includes RTS RXPWR value in CTS with new field to hold this RXPWR value (e.g., explicitly included information). STAr places the different between the CTS RXPWR and the required SNR (CTS field RXPWR−SNRreq) value into DATA frame INTF field (e.g., explicitly included information). Other details are similar as within alternative 8a.

In some examples, note that STAx may additionally ignore energy detect (ED) from a discarded frame. For example, STAx does this by increasing its ED level to be x dB above the ED of the received frame that is being discarded for the expected duration of the frame.

Also, tote that the examples of bit and byte allocations per field as described herein are examples, and other bit and byte allocations per field (e.g., more or fewer bits and/or bytes allocated per field) may be used in other examples without departing from the scope and spirit of the invention.

FIG. 7A is a diagram illustrating an embodiment of a method 700 for execution by one or more wireless communication devices. The method 701 begins by receiving (e.g., via a communication interface of the wireless communication device) a request to send (RTS) (or request to send to group (RTS to RTG)) from a first other wireless communication device (block 710). In some examples, the RTS (or RTG) is modulated within a sub-channel of a communication channel, a subset of sub-carriers, etc. (block 710a).

The method 701 continues by processing the RTS to determine whether the RTS is intended for this receiving wireless communication device and whether the RTS includes a network allocation vector (NAV) having a non-zero value (block 720).

If no (e.g., NAV is not non-zero value and not intended) (block 730), the method 701 then operates by ending. Alternatively, if yes (e.g., NAV is non-zero value and intended) (block 730), the method 701 then operates by processing one or more parameters associated with first communications between a second other wireless communication device and a third other wireless communication device to determine whether second communications between the wireless communication device and the first other wireless communication device are permissible (block 740).

If no (e.g., communications are not permissible) (block 750), the method 701 then operates by ending. Alternatively, if yes (e.g., communications are permissible) (block 750), the method 701 then operates by generating and transmitting (e.g., via the communication interface of the wireless communication device) a clear to send (CTS) to the first other wireless communication device (block 760).

Certain operations in the following methods may be understood as various means by which parameters associated with communications may be determined (e.g., such as may be used with reference to block 740 in FIG. 7A).

FIG. 7B is a diagram illustrating another embodiment of a method 701 for execution by one or more wireless communication devices. The method 701 operates by determining parameters associated with first communications between a second other wireless communication device and a third other wireless communication device based on reciprocity of communication pathway(s) within the communication system (block 711).

FIG. 7C is a diagram illustrating another embodiment of a method 702 for execution by one or more wireless communication devices. The method 702 operates by operates by determining parameters associated with first communications between a second other wireless communication device and a third other wireless communication device based on explicit information extracted from other communication(s) detected, received, and processed within the communication system (block 722).

FIG. 7D is a diagram illustrating another embodiment of a method 703 for execution by one or more wireless communication devices. The method 702 operates by determining a first subset of parameters associated with first communications between a second other wireless communication device and a third other wireless communication device based on reciprocity of communication pathway(s) within the communication system (block 713). The method 702 then operates by determining a second subset of parameters associated with first communications between the second other wireless communication device and the third other wireless communication device based on explicit information extracted from other communication(s) detected, received, and processed within the communication system (block 723).

It is noted that the various operations and functions described within various methods herein may be performed within a wireless communication device (e.g., such as by the processing circuitry 330, communication interface 320, and memory 340 or processing circuitry 330a such as described with reference to FIG. 2B) and/or other components therein. Generally, a communication interface and processing circuitry in a wireless communication device can perform such operations.

Examples of some components may include one of more baseband processing modules, one or more media access control (MAC) layer components, one or more physical layer (PHY) components, and/or other components, etc. For example, such a processing circuitry can perform baseband processing operations and can operate in conjunction with a radio, analog front end (AFE), etc. The processing circuitry can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processing circuitry in a first device and another processing circuitry within a second device. In other embodiments, such processing is performed wholly by a processing circuitry within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" or their equivalents may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processing circuitries, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc.

described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, a processing circuitry, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
    a communication interface; and
    processing circuitry that is coupled to the communication interface, wherein at least one of the communication interface or the processing circuitry configured to:
        receive, via the communication interface and from a first other wireless communication device, a request to send to group (RTG) addressed to the wireless communication device and another wireless communication device, wherein the RTG is modulated within a sub-channel of a communication channel;
        process the RTG to determine whether the RTG is at least addressed to the wireless communication device and whether the RTG includes a network allocation vector (NAV) having a non-zero value;
        based on a first determination that the RTG is at least addressed to the wireless communication device and the NAV of the RTG has the non-zero value, process one or more parameters associated with first communications between a second other wireless communication device and a third other wireless communication device to determine whether second communications between the wireless communication device and the first other wireless communication device are permissible; and
        based on a second determination that the second communications between the wireless communication device and the first other wireless communication device are permissible, generate and transmit a first CTS via the communication interface and to the first other wireless communication device at a same time that the another wireless communication device transmits a second CTS via the communication interface and to the first other wireless communication device.

2. The wireless communication device of claim 1, wherein the at least one of the communication interface or the processing circuitry is further configured to:
    process at least one of the first communications between the second other wireless communication device and the third other wireless communication device or other communications between the second other wireless communication device and the third other wireless communication device to determine at least one of the one or more parameters associated with the first communications between the second other wireless communication device and the third other wireless communication.

3. The wireless communication device of claim 2, wherein the at least one of the first communications between the second other wireless communication device and the third other wireless communication device or the other communications between the second other wireless communication device and the third other wireless communication device explicitly includes information that specifies at least one of a first transmit power level of a first transmission from the second other wireless communication device, a second transmit power level of a second transmission from the third other wireless communication device, a first receive power level of a third transmission received by the second other wireless communication device, a second receive power level of a fourth transmission received by the third other wireless communication device, a signal to noise ratio (SNR) of a communication pathway between the second other wireless communication device and the third other wireless communication device, a signal to interference noise ratio (SINK) of the communication pathway between the second other wireless communication device and the third other wireless communication device.

4. The wireless communication device of claim 2, wherein the at least one of the communication interface or the processing circuitry is further configured to:
    based on the first communications between the second other wireless communication device and the third other wireless communication device including a first transmission from the second other wireless communication device, process the first transmission from the second other wireless communication device to determine a first receive power level of the first transmission at the wireless communication device;
    based on the first communications between the second other wireless communication device and the third other wireless communication device including a second transmission from the third other wireless communication device, process the second transmission from the third other wireless communication device to determine a second receive power level of the second transmission at the wireless communication device;
    estimate a third receive power level of a first other transmission from the wireless communication device and received by the second other wireless communication device based on the first receive power level of the first communication and based on the reciprocity of a first communication pathway between the wireless communication device and the second other wireless communication device; and estimate a fourth receive power level of a second other transmission from the wireless communication device and received by the third other wireless communication device based on the second receive power level of the first communication and based on the reciprocity of a second communication pathway between the wireless communication device and the third other wireless communication device, wherein at least one of the one or more parameters associated with the first communications between the second other wireless communication device and the third other wireless communication includes at least one of the third receive power level or the fourth receive power level.

5. The wireless communication device of claim 1, wherein the at least one of the communication interface or the processing circuitry is further configured to:
receive, after transmission of the first CTS to the first other wireless communication device, a data frame from the first other wireless communication device via the communication interface during ongoing communications between the second other wireless communication device and the third other wireless communication device.

6. The wireless communication device of claim 1 further comprising:
the communication interface configured to support communications within at least one of a satellite communication system, a wireless communication system, a wired communication system, a fiber-optic communication system, or a mobile communication system.

7. The wireless communication device of claim 1 further comprising:
a wireless station (STA), wherein at least one of the first other wireless communication device, the second other wireless communication device, or the third other wireless communication device includes an access point (AP).

8. The wireless communication device of claim 1 further comprising:
an access point (AP), wherein at least one of the first other wireless communication device, the second other wireless communication device, or the third other wireless communication device includes a wireless station (STA).

9. A wireless communication device comprising:
a communication interface; and
processing circuitry that is coupled to the communication interface, wherein at least one of the communication interface or the processing circuitry configured to:
receive, via the communication interface and from a first other wireless communication device, a request to send to group (RTG) addressed to the wireless communication device and another wireless communication device, wherein the RTG is modulated within a sub-channel of a communication channel;
process the RTG to determine whether the RTG is at least addressed to the wireless communication device and whether the RTG includes a network allocation vector (NAV) having a non-zero value;
process at least one of first communications between a second other wireless communication device and a third other wireless communication device or other communications between the second other wireless communication device and the third other wireless communication device to determine one or more parameters associated with the first communications between the second other wireless communication device and the third other wireless communication, wherein the one or more parameters associated with first communications between a second other wireless communication device and a third other wireless communication device are based on reciprocity of respective communication pathways;
based on a first determination that the RTG is at least addressed to the wireless communication device and the NAV of the RTG has the non-zero value, process the one or more parameters associated with first communications between the second other wireless communication device and the third other wireless communication device to determine whether second communications between the wireless communication device and the first other wireless communication device are permissible;
based on a second determination that the second communications between the wireless communication device and the first other wireless communication device are permissible, generate and transmit a first CTS to the first other wireless communication device at a same time that the another wireless communication device transmits a second CTS via the communication interface and to the first other wireless communication device; and
receive, after transmission of the first CTS to the first other wireless communication device, a data frame via the communication interface and from the first other wireless communication device during ongoing communications between the second other wireless communication device and the third other wireless communication device.

10. The wireless communication device of claim 9, wherein the at least one of the first communications between the second other wireless communication device and the third other wireless communication device or the other communications between the second other wireless communication device and the third other wireless communication device explicitly includes information that specifies at least one of a first transmit power level of a first transmission from the second other wireless communication device, a second transmit power level of a second transmission from the third other wireless communication device, a first receive power level of a third transmission received by the second other wireless communication device, a second receive power level of a fourth transmission received by the third other wireless communication device, a signal to noise ratio (SNR) of a communication pathway between the second other wireless communication device and the third other wireless communication device, a signal to interference noise ratio (SINK) of the communication pathway between the second other wireless communication device and the third other wireless communication device.

11. The wireless communication device of claim 9, wherein the at least one of the communication interface or the processing circuitry is further configured to:
based on the first communications between the second other wireless communication device and the third other wireless communication device including a first transmission from the second other wireless communication device, process the first transmission from the second other wireless communication device to determine a first receive power level of the first transmission at the wireless communication device;
based on the first communications between the second other wireless communication device and the third other wireless communication device including a second transmission from the third other wireless communication device, process the second transmission from the third other wireless communication device to determine a second receive power level of the second transmission at the wireless communication device;

estimate a third receive power level of a first other transmission from the wireless communication device and received by the second other wireless communication device based on the first receive power level of the first communication and based on the reciprocity of a first communication pathway between the wireless communication device and the second other wireless communication device; and estimate a fourth receive power level of a second other transmission from the wireless communication device and received by the third other wireless communication device based on the second receive power level of the first communication and based on the reciprocity of a second communication pathway between the wireless communication device and the third other wireless communication device, wherein at least one of the one or more parameters associated with the first communications between the second other wireless communication device and the third other wireless communication includes at least one of the third receive power level or the fourth receive power level.

12. The wireless communication device of claim 9 further comprising:
the communication interface configured to support communications within at least one of a satellite communication system, a wireless communication system, a wired communication system, a fiber-optic communication system, or a mobile communication system.

13. The wireless communication device of claim 9 further comprising:
an access point (AP), wherein at least one of the first other wireless communication device, the second other wireless communication device, or the third other wireless communication device includes a wireless station (STA).

14. A method for execution by a wireless communication device, the method comprising:
receiving, via a communication interface of the wireless communication device and from a first other wireless communication device, a request to send to group (RTG) addressed to the wireless communication device and another wireless communication device, wherein the RTG is modulated within a sub-channel of a communication channel;
processing the RTG to determine whether the RTG is intended for the wireless communication device and whether the RTG includes a network allocation vector (NAV) having a non-zero value;
based on a first determination that the RTG is at least addressed to the wireless communication device and the NAV of the RTG has the non-zero value, processing one or more parameters associated with first communications between a second other wireless communication device and a third other wireless communication device to determine whether second communications between the wireless communication device and the first other wireless communication device are permissible; and
based on a second determination that the second communications between the wireless communication device and the first other wireless communication device are permissible, generating and transmitting, via the communication interface of the wireless communication device, a first CTS to the first other wireless communication device at a same time that the another wireless communication device transmits a second CTS via the communication interface and to the first other wireless communication device.

15. The method of claim 14 further comprising:
processing at least one of the first communications between the second other wireless communication device and the third other wireless communication device or other communications between the second other wireless communication device and the third other wireless communication device to determine at least one of the one or more parameters associated with the first communications between the second other wireless communication device and the third other wireless communication.

16. The method of claim 15, wherein the at least one of the first communications between the second other wireless communication device and the third other wireless communication device or the other communications between the second other wireless communication device and the third other wireless communication device explicitly includes information that specifies at least one of a first transmit power level of a first transmission from the second other wireless communication device, a second transmit power level of a second transmission from the third other wireless communication device, a first receive power level of a third transmission received by the second other wireless communication device, a second receive power level of a fourth transmission received by the third other wireless communication device, a signal to noise ratio (SNR) of a communication pathway between the second other wireless communication device and the third other wireless communication device, a signal to interference noise ratio (SINR) of the communication pathway between the second other wireless communication device and the third other wireless communication device.

17. The method of claim 15 further comprising:
based on the first communications between the second other wireless communication device and the third other wireless communication device including a first transmission from the second other wireless communication device, processing the first transmission from the second other wireless communication device to determine a first receive power level of the first transmission at the wireless communication device;
based on the first communications between the second other wireless communication device and the third other wireless communication device including a second transmission from the third other wireless communication device, processing the second transmission from the third other wireless communication device to determine a second receive power level of the second transmission at the wireless communication device;
estimating a third receive power level of a first other transmission from the wireless communication device and received by the second other wireless communication device based on the first receive power level of the first communication and based on the reciprocity of a first communication pathway between the wireless communication device and the second other wireless communication device; and
estimating a fourth receive power level of a second other transmission from the wireless communication device and received by the third other wireless communication device based on the second receive power level of the first communication and based on the reciprocity of a second communication pathway between the wireless communication device and the third other wireless communication device, wherein at least one of the one or more parameters associated with the first communications between the second other wireless communication device and the third other wireless communication includes at least one of the third receive power level or the fourth receive power level.

18. The method of claim 14 further comprising:
receiving, via the communication interface of the wireless communication device and after transmission of the first CTS to the first other wireless communication device, a data frame from the first other wireless communication device during ongoing communications between the second other wireless communication device and the third other wireless communication device.

19. The method of claim 14, wherein the wireless communication device includes a wireless station (STA), and at least one of the first other wireless communication device, the second other wireless communication device, or the third other wireless communication device includes an access point (AP).

20. The method of claim 14, wherein the wireless communication device includes an access point (AP), and at least one of the first other wireless communication device, the second other wireless communication device, or the third other wireless communication device includes a wireless station (STA).

* * * * *